United States Patent
Zhang et al.

(10) Patent No.: US 11,216,820 B2
(45) Date of Patent: Jan. 4, 2022

(54) ASSET TRANSFER REVERSAL METHOD AND APPARATUS, AND ELECTRONIC DEVICE

(71) Applicant: Advanced New Technologies Co., Ltd., Grand Cayman (KY)

(72) Inventors: Junliang Zhang, Hangzhou (CN); Danqing Hu, Hangzhou (CN); Sen Lin, Shanghai (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/425,050

(22) Filed: May 29, 2019

(65) Prior Publication Data

US 2019/0370811 A1    Dec. 5, 2019

(30) Foreign Application Priority Data

May 29, 2018   (CN) .......................... 201810535417.6

(51) Int. Cl.
*G06Q 20/40* (2012.01)
*G06Q 20/06* (2012.01)
(Continued)

(52) U.S. Cl.
CPC ....... *G06Q 20/407* (2013.01); *G06Q 20/0658* (2013.01); *G06Q 20/3678* (2013.01); *H04L 9/0637* (2013.01)

(58) Field of Classification Search
CPC ............. G06Q 20/407; G06Q 20/0658; G06Q 20/3678; H04L 9/0637
See application file for complete search history.

(56) References Cited

U.S. PATENT DOCUMENTS 10,169,757 B1 * 1/2019 Vippagunta ............. G06F 16/24
2009/0024527 A1 * 1/2009 Sellen .................... G06Q 20/20
705/44
(Continued)

FOREIGN PATENT DOCUMENTS

CN         105488722          4/2016
CN         105809420          7/2016
(Continued)

OTHER PUBLICATIONS

How to Refund a Bitcoin Transaction, Apr. 21, 2017, Youtube.com, https://www.youtube.com/watch?v=Z2WCodqAEJo (Year: 2017).*
(Continued)

*Primary Examiner* — Neha Patel
*Assistant Examiner* — Nilesh B Khatri
(74) *Attorney, Agent, or Firm* — Fish & Richardson P.C.

(57) ABSTRACT

A blockchain asset that is transferred from a second blockchain member is received at a first blockchain member in response to an asset transfer request for transferring an asset between a payer and a payee, where the first blockchain member and the second blockchain member associated with a blockchain. In response to receiving the blockchain asset, an off-chain asset transfer-out operation for the payee is performed by the first blockchain member. If the off-chain asset transfer-out operation fails, a transaction reversal application for an asset transfer transaction corresponding to the asset transfer request is written into the blockchain by the first blockchain member. In response to writing the transaction reversal application, an asset clearing with the second blockchain member for an off-chain asset corresponding to the off-chain asset transfer-out operation is performed by the first blockchain member.

15 Claims, 9 Drawing Sheets

(51) Int. Cl.
  *G06Q 20/36* (2012.01)
  *H04L 9/06* (2006.01)

(56) References Cited

U.S. PATENT DOCUMENTS

| | | | |
|---|---|---|---|
| 2014/0114852 A1 | 4/2014 | Rajagopal et al. | |
| 2014/0122270 A1* | 5/2014 | Argue | G06Q 20/047 705/21 |
| 2014/0364552 A1 | 12/2014 | Katakami | |
| 2015/0170112 A1 | 6/2015 | DeCastro | |
| 2015/0262137 A1 | 9/2015 | Armstrong | |
| 2015/0271183 A1 | 9/2015 | MacGregor et al. | |
| 2015/0332256 A1* | 11/2015 | Minor | G06Q 20/381 705/69 |
| 2015/0332283 A1 | 11/2015 | Witchey | |
| 2015/0365283 A1 | 12/2015 | Ronca et al. | |
| 2016/0092988 A1 | 3/2016 | Letourneau | |
| 2016/0203477 A1* | 7/2016 | Yang | G06Q 20/3678 705/69 |
| 2016/0260169 A1 | 9/2016 | Arnold et al. | |
| 2016/0275461 A1 | 9/2016 | Sprague et al. | |
| 2016/0330034 A1 | 11/2016 | Back et al. | |
| 2016/0342988 A1* | 11/2016 | Thomas | G06Q 20/0855 |
| 2017/0005804 A1 | 1/2017 | Zinder | |
| 2017/0046651 A1 | 2/2017 | Lin et al. | |
| 2017/0046664 A1 | 2/2017 | Haldenby et al. | |
| 2017/0048235 A1 | 2/2017 | Lohe et al. | |
| 2017/0109735 A1 | 4/2017 | Sheng et al. | |
| 2017/0132626 A1 | 5/2017 | Kennedy | |
| 2017/0140371 A1* | 5/2017 | Forzley | G06Q 20/065 |
| 2017/0154331 A1 | 6/2017 | Voorhees | |
| 2017/0236102 A1* | 8/2017 | Biton | H04L 9/14 705/64 |
| 2017/0236104 A1 | 8/2017 | Biton | |
| 2017/0237554 A1 | 8/2017 | Jacobs et al. | |
| 2017/0243193 A1 | 8/2017 | Manian et al. | |
| 2017/0344988 A1 | 11/2017 | Cusden et al. | |
| 2017/0331896 A1 | 12/2017 | Holloway et al. | |
| 2017/0364552 A1 | 12/2017 | Pattanaik et al. | |
| 2017/0366357 A1 | 12/2017 | Pattanaik et al. | |
| 2018/0005235 A1 | 1/2018 | Thorne | |
| 2018/0005320 A1* | 1/2018 | Huang | G06Q 20/26 |
| 2018/0012311 A1 | 1/2018 | Small et al. | |
| 2018/0046992 A1 | 2/2018 | Hanrahan et al. | |
| 2018/0053162 A1* | 2/2018 | Janes | G06Q 20/407 |
| 2018/0096349 A1* | 4/2018 | McDonald | G06Q 20/102 |
| 2018/0101844 A1 | 4/2018 | Song et al. | |
| 2018/0101848 A1 | 4/2018 | Castagna et al. | |
| 2018/0144156 A1 | 5/2018 | Marin | |
| 2018/0191503 A1 | 7/2018 | Alwar et al. | |
| 2018/0240112 A1 | 8/2018 | Castinado et al. | |
| 2018/0365670 A1 | 12/2018 | Dunjic et al. | |
| 2019/0026821 A1 | 1/2019 | Bathen et al. | |
| 2019/0052454 A1 | 2/2019 | Wright et al. | |
| 2019/0066206 A1 | 2/2019 | Marks | |
| 2019/0108582 A1* | 4/2019 | Sebastian | G06Q 20/00 |
| 2019/0130399 A1 | 5/2019 | Wright et al. | |
| 2019/0165930 A1 | 5/2019 | Castinado et al. | |
| 2019/0340586 A1* | 11/2019 | Sheng | G06N 20/00 |
| 2019/0370798 A1 | 12/2019 | Hu et al. | |
| 2019/0370807 A1 | 12/2019 | Hu et al. | |
| 2019/0370809 A1 | 12/2019 | Hu et al. | |
| 2019/0370810 A1 | 12/2019 | Hu et al. | |

FOREIGN PATENT DOCUMENTS

| | | |
|---|---|---|
| CN | 106327332 | 1/2017 |
| CN | 106504085 | 3/2017 |
| CN | 106960388 | 7/2017 |
| CN | 107016542 | 8/2017 |
| CN | 107038578 | 8/2017 |
| CN | 107133796 | 9/2017 |
| CN | 107194678 | 9/2017 |
| CN | 107341702 | 11/2017 |
| CN | 107358420 | 11/2017 |
| CN | 107358524 | 11/2017 |
| CN | 107392584 | 11/2017 |
| CN | 107742210 | 2/2018 |
| CN | 108009811 | 5/2018 |
| CN | 108038683 | 5/2018 |
| CN | 108055138 | 5/2018 |
| CN | 108074177 | 5/2018 |
| CN | 108876335 | 11/2018 |
| JP | 6218979 | 10/2017 |
| RU | 2467501 | 11/2012 |
| RU | 2665869 | 9/2018 |
| TW | 200834456 | 8/2008 |
| TW | 201732697 | 9/2017 |
| TW | 201800997 | 1/2018 |
| TW | 201810150 | 3/2018 |
| TW | 201816679 | 5/2018 |
| WO | WO 2009012452 | 1/2009 |
| WO | WO 2017070469 | 4/2017 |
| WO | WO 2017145047 | 8/2017 |
| WO | WO 2018204548 | 11/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report issued in European Application No. 19727819.5 dated Feb. 12, 2020, 10 pages.

Stellar.com [Online], "Stellar—Developers," Apr. 15, 2017, [retrieved on Jan. 14, 2020], retrieved from URL<https://web.archive.org/web/2017G415145348/https://www.stellar.org/developers/guides/get-started/index.html>, 118 pages.

PCT International Preliminary Reporton Patentability in International Application No. PCT/US2019/034260, dated Dec. 1, 2020, 5 pages.

PCT International Search Report and Written Opinion in International Application No. PCT/US2019/034251, dated Aug. 2, 2019, 7 pages.

PCT International Search Report and Written Opinion in International Application No. PCT/US2019/034253, dated Jul. 25, 2019, 5 pages.

PCT International Search Report and Written Opinion in International Application No. PCT/US2019/034257, dated Aug. 15, 2019, 6 pages.

PCT International Search Report and Written Opinion in International Application No. PCT/US2019/034260, dated Aug. 15, 2019, 6 pages.

PCT International Search Report and Written Opinion in International Application No. PCT/US2019/034266, dated Aug. 16, 2019, 6 pages.

* cited by examiner

A first blockchain member corresponding to a payee obtains a blockchain asset transferred in by a second blockchain member corresponding to a payer in response to an asset transfer request between the payer and the payee, and performs a corresponding off-chain asset transfer-out operation for the payee — 102

The first blockchain member writes a transaction reversal application for an asset transfer transaction corresponding to the asset transfer request into a blockchain when the transfer-out operation fails — 104

The first blockchain member performs asset clearing with the second blockchain member for an off-chain asset corresponding to the transfer-out operation — 106

FIG. 1

ASSET TRANSFER REVERSAL METHOD AND APPARATUS, AND ELECTRONIC DEVICE

CROSS-REFERENCE TO RELATED APPLICATIONS

This application claims priority to Chinese Patent Application No. 201810535417.6, filed on May 29, 2018, which is hereby incorporated by reference in its entirety.

TECHNICAL FIELD

One or more implementations of the present specification relate to the field of terminal technologies, and in particular, to an asset transfer reversal processing method and apparatus, and an electronic device.

BACKGROUND

In related technologies, a solution for implementing asset transfer through a blockchain network is proposed. For example, the asset transfer is implemented between different blockchain members, or the asset transfer is implemented between a plurality of accounts of the same blockchain member. If the asset transfer cannot be directly implemented between an asset payer and an asset payee, the asset transfer can be implemented by the payer and the payee by using another blockchain member as an intermediate.

SUMMARY

In view of this, one or more implementations of the present specification provide an asset transfer reversal processing method and apparatus, and an electronic device.

To achieve the previous objective, one or more implementations of the present specification provide the following technical solutions:

According to a first aspect of one or more implementations of the present specification, an asset transfer reversal processing method is proposed, including: obtaining, by a first blockchain member corresponding to a payee, a blockchain asset transferred in by a second blockchain member corresponding to a payer in response to an asset transfer request between the payer and the payee, and performing a corresponding off-chain asset transfer-out operation for the payee; writing, by the first blockchain member, a transaction reversal application for an asset transfer transaction corresponding to the asset transfer request into a blockchain when the transfer-out operation fails; and performing, by the first blockchain member, asset clearing with the second blockchain member for an off-chain asset corresponding to the transfer-out operation.

According to a second aspect of one or more implementations of the present specification, an asset transfer reversal processing apparatus is proposed, including: an asset transfer unit, configured to enable a first blockchain member corresponding to a payee to obtain a blockchain asset transferred in by a second blockchain member corresponding to a payer in response to an asset transfer request between the payer and the payee, and perform a corresponding off-chain asset transfer-out operation for the payee; a reversal application unit, configured to enable the first blockchain member to write a transaction reversal application for an asset transfer transaction corresponding to the asset transfer request into a blockchain when the transfer-out operation fails; and an asset clearing unit, configured to enable the first blockchain member to perform asset clearing with the second blockchain member for an off-chain asset corresponding to the transfer-out operation.

According to a third aspect of one or more implementations of the present specification, an electronic device is proposed, including: a processor; and a memory, configured to store an instruction that can be executed by the processor, where the processor is configured to implement the method according to any one of the previous implementations.

BRIEF DESCRIPTION OF DRAWINGS

FIG. 1 is a flowchart illustrating an asset transfer reversal processing method, according to an example implementation;

DESCRIPTION OF IMPLEMENTATIONS

Figure 2:
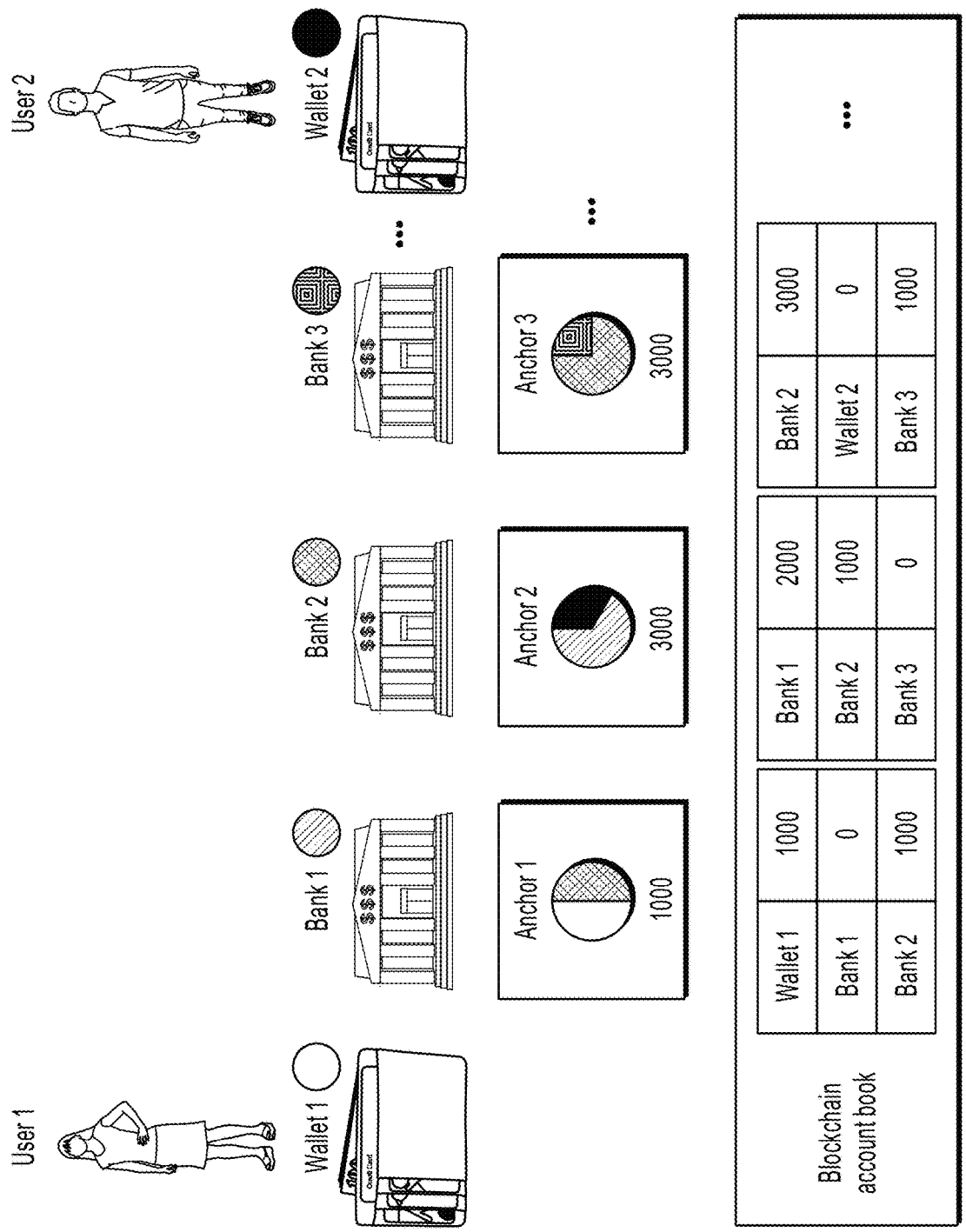
FIG. 2 is a schematic diagram illustrating a remittance scenario, according to an example implementation.

Example implementations are described in detail here, and examples of the example implementations are presented in the accompanying drawings. When the following description relates to the accompanying drawings, unless specified otherwise, the same numbers in different accompanying drawings represent same or similar elements. Implementations described in the following example implementations do not represent all implementations consistent with one or more implementations of the present specification. On the contrary, the implementations are only examples of apparatuses and methods that are described in the appended claims in detail and consistent with some aspects of the one or more implementations of the present specification.

It is worthwhile to note that in other implementations, steps of the corresponding method are not necessarily performed in the order shown and described in the present specification. In some other implementations, the method can include more or fewer steps than those described in the present specification. In addition, a single step described in the present specification can be divided into a plurality of steps for description in another implementation, and a plurality of steps described in the present specification can be combined into a single step for description in another implementation.

FIG. 1 is a flowchart illustrating an asset transfer reversal processing method, according to an example implementation. As shown in FIG. 1, the method can include the following steps.

Step 102: A first blockchain member corresponding to a payee obtains a blockchain asset transferred in by a second blockchain member corresponding to a payer in response to an asset transfer request between the payer and the payee, and performs a corresponding off-chain asset transfer-out operation for the payee.

In an implementation, "assets" in the present specification can be in any type, such as cash, securities, and stocks; or devices, vehicles, estates, and goods. Implementations are not limited in the present specification.

In an implementation, the asset transfer request can be initiated by the first blockchain member so that the payee collects a corresponding asset from the payer, or the asset transfer request can be initiated by the second blockchain member so that the payer pays a corresponding asset to the payee.

In an implementation, a blockchain can include several blockchain nodes, and these blockchain nodes can include a blockchain member (or referred to as a member for short) and an anchor point. A role of the anchor point can be assumed by the blockchain member, or the anchor point can be independent of the blockchain member. To be specific, the role of the anchor point is unnecessarily assumed by the blockchain member.

In an implementation, the blockchain member can be a financial institution, an organization or platform in another form that supports an asset transfer service. Implementations are not limited in the present specification.

In an implementation, the anchor point is used to anchor point blockchain assets on the blockchain to off-chain assets outside the blockchain, so that the off-chain asset can be exchanged for an equivalent blockchain asset through the anchor point, and the blockchain asset can also be exchanged for an equivalent off-chain asset through the anchor point, thereby implementing one-to-one mapping between the blockchain assets and off-chain assets. For example, the blockchain member can store the off-chain asset at the anchor point, and obtain and hold a blockchain asset correspondingly issued by the anchor point on the blockchain. In addition, blockchain members can also transfer held blockchain assets to each other. Holdings of the blockchain members in blockchain assets issued by anchor points and changes of the blockchain assets can be registered in a blockchain account book of the blockchain, to achieve a unified blockchain asset management.

In an implementation, the payer can pay an off-chain asset to the second blockchain member. The second blockchain member transfers a held blockchain asset to the first blockchain member in response to the asset transfer request. Then the first blockchain member pays an off-chain asset to the payee, which is equivalent to that the payer eventually pays the off-chain asset to the payee.

In an implementation, when the second blockchain member and the first blockchain member hold blockchain assets issued by the same anchor point, the second blockchain member can directly transfer the held blockchain asset issued by the anchor point to the first blockchain member.

In an implementation, when the second blockchain member and the first blockchain member do not hold blockchain assets issued by the same anchor point, or an asset amount of blockchain assets issued by the anchor point and transferred in by the second blockchain member is insufficient, or the second blockchain member cannot directly transfer an asset due to other problems, the second blockchain member can transfer the blockchain asset to the first blockchain member by using several intermediate blockchain members. For example, both the second blockchain member and the intermediate blockchain member hold blockchain assets issued by a first anchor point, and both the intermediate blockchain member and the first blockchain member hold blockchain assets issued by a second anchor point. The second blockchain member can first transfer the blockchain asset issued by the first anchor point to the intermediate blockchain member, and then the intermediate blockchain member transfers the blockchain asset issued by the second anchor point to the first blockchain member. For another example, both the second blockchain member and a first intermediate blockchain member hold blockchain assets issued by a first anchor point, both the first intermediate blockchain member and a second intermediate blockchain member hold blockchain assets issued by a second anchor point, and both the second intermediate blockchain member and the first blockchain member hold blockchain assets issued by a third anchor point. The second blockchain member can first transfer the blockchain asset issued by the first anchor point to the first intermediate blockchain member, then the first intermediate blockchain member transfers the blockchain asset issued by the second anchor point to the second intermediate blockchain member, and finally the second intermediate blockchain member transfers the blockchain asset issued by the third anchor point to the first blockchain member.

In an implementation, blockchain members such as the first blockchain member and the second blockchain member have verified the payer and the payee in advance and the previous asset transfer operation is allowed to be performed after the verification succeeds. Therefore, the previous asset transfer process usually can be successfully completed in most cases. However, in some cases, the first blockchain member possibly cannot perform the previous transfer-out operation for the payee due to various reasons such as insufficient collection amount and account freezing of the payee, and consequently, the transfer-out operation fails. Therefore, asset reversal processing needs to be performed on a related asset by using the technical solutions in the present specification.

In an implementation, the asset transfer solution in the present specification can be applied to various asset transfer scenarios, such as domestic asset transfer and cross-border asset transfer. Implementations are not limited in the present specification.

In an implementation, the blockchain in the present specification can be a consortium chain, and each member participating in asset transfer is a consortium member of the consortium chain. The consortium chain can also include more other consortium members. Implementations are not limited in the present specification.

Step 104: The first blockchain member writes a transaction reversal application for an asset transfer transaction corresponding to the asset transfer request into a blockchain when the transfer-out operation fails.

In an implementation, the second blockchain member can return the off-chain asset transferred in by the payer based on the transaction reversal application.

In an implementation, the transaction reversal application is published on the blockchain. Because information on the blockchain cannot be tampered with and can be traced, the transaction reversal application registered in the blockchain account book is reliable enough and can be trusted by all the blockchain members and anchor points. Therefore, the second blockchain member can return the related off-chain asset to the payer in advance based on the transaction reversal application, without worrying that the first blockchain member refuses to return a related asset to the second blockchain member. Therefore, the payer can obtain the returned off-chain asset as soon as possible while ensuring the reliability of asset reversal processing.

In an implementation, the first blockchain member can write a serial number of the asset transfer transaction into the transaction reversal application, or other information that can uniquely represent the asset transfer transaction, so that when querying the transaction reversal application, the blockchain member can determine that the blockchain member is related to the corresponding asset transfer transaction, or the blockchain member can find the transaction reversal application based on information such as the serial number of the asset transfer transaction.

In an embodiment, a time interval between a write-in moment of the transaction reversal application and a creation moment of the asset transfer transaction is not greater than a preset interval. In other words, duration (for example, seven days or any other duration) of the preset interval can be set in advance, so that the duration between the moment of writing the transaction reversal application into the blockchain and the moment of creating the asset transfer transaction is not too long, thereby helping reduce a security risk.

Step 106: The first blockchain member performs asset clearing with the second blockchain member for an off-chain asset corresponding to the transfer-out operation.

In an implementation, the first blockchain member can count the off-chain asset corresponding to the transfer-out operation into a preset off-chain account. Then the first blockchain member regularly summarizes surplus assets in the preset off-chain account, to return the surplus assets to the second blockchain member to complete asset clearing. In other words, the first blockchain member can reserve the blockchain asset transferred in by the second blockchain member, and implement clearing by using the off-chain asset, to reduce asset transfer operations on the blockchain and reduce the complexity of asset clearing.

In an implementation, the first blockchain member can transfer a blockchain asset to the second blockchain member, and the transferred blockchain asset is equal to the blockchain asset transferred by the second blockchain member to the first blockchain member based on the asset transfer request. For example, the first blockchain member can return the blockchain asset transferred in by the second blockchain member based on an original route. For another example, the first blockchain member can transfer a held blockchain asset issued by an anchor point to the second blockchain member, provided that an asset amount is an amount that needs to be returned.

For ease of understanding, the technical solutions in one or more implementations of the present specification are described below by using an example of a "remittance" process. FIG. 2 is a schematic diagram illustrating a remittance scenario, according to an example implementation. As shown in FIG. 2, assume that a third-party payment platform operates wallet 1 at A and operates wallet 2 at B, user 1 at A opens customer fund account 1 in wallet 1, and user 2 at B opens customer fund account 2 in wallet 2. Fast remittance can be implemented between user 1 and user 2 based on the fund transfer solution in the present specification.

In an implementation, assume that wallet 1, wallet 2, bank 1, bank 2, and bank 3 shown in FIG. 2, all are members of the same blockchain, and the blockchain can include several anchor points such as anchor point 1, anchor point 2, and anchor point 3 shown in FIG. 2. The member can assume a role of the anchor point. For example, anchor point 1 to anchor point 3 in FIG. 2 respectively correspond to bank 1 to bank 3. Certainly, the member possibly does not assume the role of the anchor point, and the anchor point is not necessarily the member. To be specific, there is not necessarily a one-to-one mapping relationship between the members and the anchor points. Members such as wallets 1 and 2 and banks 1 to 3, and anchor points 1 to 3 all are nodes on the blockchain, and these nodes implement distributed accounting on the blockchain.

To implement remittance between user 1 and user 2 by using the members on the blockchain, members such as wallets 1 and 2, and banks 1 to 3 need to join a contract corresponding to a "remittance" service in advance, such as a so-called remittance contract here. Each member can deposit an amount of funds at each anchor point, and the corresponding anchor point can issue a corresponding blockchain asset on the blockchain. The member that deposits the funds holds the blockchain asset to form a blockchain balance of the member. For example, after wallet 1 deposits a 1000 yuan off-chain asset at anchor point 1, anchor point 1 can issue a 1000 yuan blockchain asset, which can then be held by wallet 1. In addition, different members can transfer held blockchain assets to each other. For example, although bank 1 deposits only a 1000 yuan off-chain asset at anchor point 2, bank 1 obtains a 1000 yuan blockchain asset issued by anchor point 2 from bank 2 or another member. Therefore, bank 1 can hold a 2000 yuan blockchain asset issued by anchor point 2. Assume that a blockchain balance held by wallet 1 is a 1000 yuan blockchain asset issued by anchor point 1, a blockchain balance held by bank 1 is a 2000 yuan blockchain asset issued by anchor point 2, a blockchain balance held by bank 2 is a 1000 yuan blockchain asset issued by anchor point 1, a 1000 yuan blockchain asset issued by anchor point 2, and a 3000 yuan blockchain asset issued by anchor point 3, and a blockchain balance held by bank 3 is a 1000 yuan blockchain asset issued by anchor point 3. After joining the remittance contract, all the members are restricted by the remittance contract, so that the blockchain balance held by each member is registered in a blockchain account book of the blockchain. A unified distributed account book is maintained by a plurality of accounting nodes (usually more than four) on the blockchain. The account book records the blockchain balance held by each member. The accounting nodes make contents of account books recorded at all the nodes consistent with each other through inter-node broadcast and a consensus algorithm, and all contents are full account information on the blockchain. Therefore, it can be considered that all the nodes on the blockchain use a unified account book, that is, the previous blockchain account book. Because information on the blockchain cannot be tampered with and can be traced, the information registered in the blockchain account book is reliable, and can be trusted by all the members and anchor points. Therefore, the information can be used as a basis for operations in various fund transfer scenarios such as transfer and payment.

In addition, each member needs to record their trust in each anchor point in the blockchain account book, so that the recorded trust can be used in a subsequent route determining process. For example, as shown in FIG. 2, although wallet 2 does not hold a blockchain asset issued by anchor point 3, because wallet 2 sets anchor point 3 as a trusted anchor point, the trust is expressed by "blockchain balance is 0" in FIG. 2, indicating that wallet 2 is willing to receive a blockchain asset issued by anchor point 3 (for example, a blockchain asset transferred in by another member). However, anchor point 1 possibly is an untrusted anchor point of wallet 2, indicating that wallet 2 is unwilling to receive a blockchain asset issued by anchor point 1.

Figure 3:
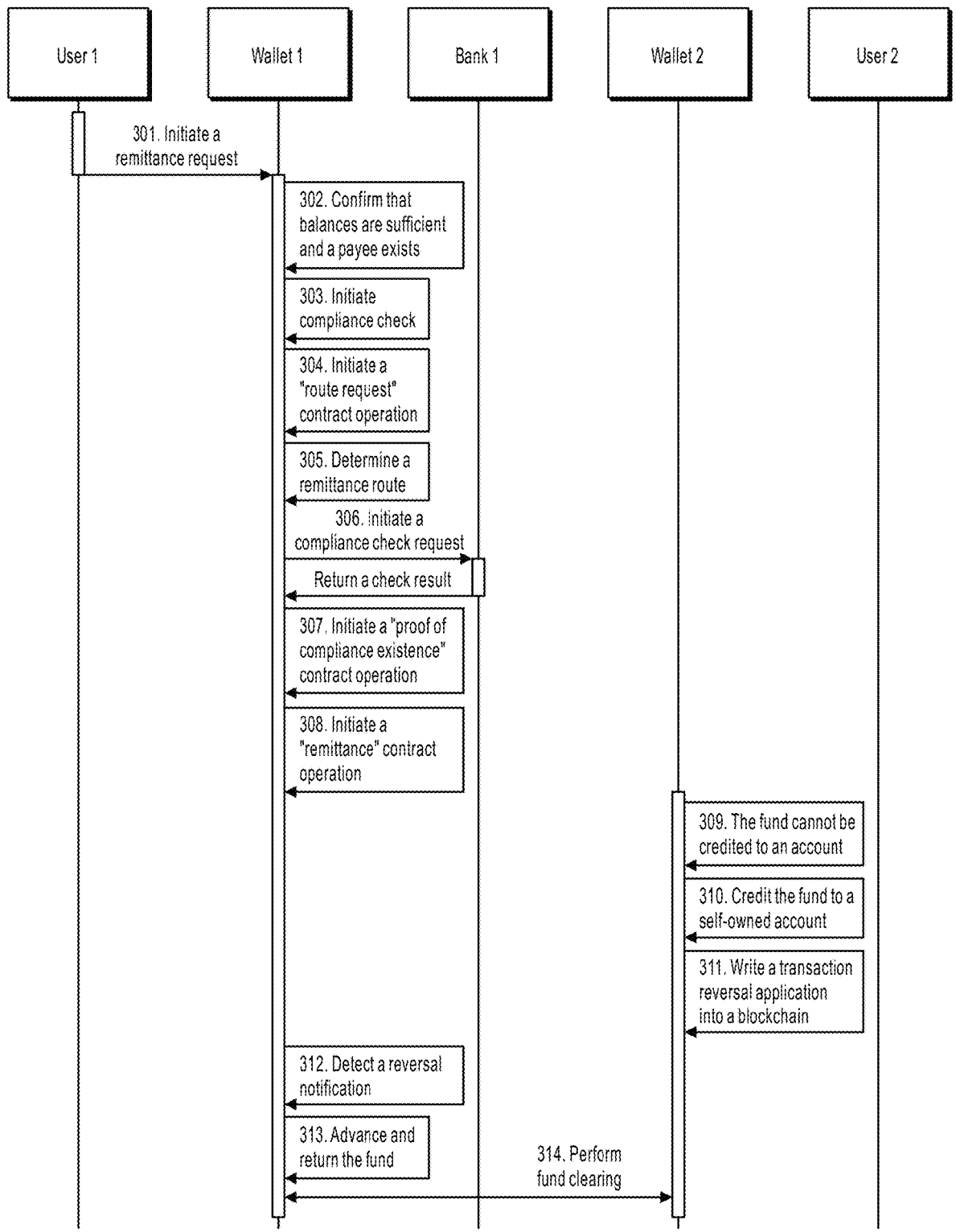
FIG. 3 is a schematic diagram illustrating interaction in a remittance process, according to an example implementation.

Based on FIG. 2, FIG. 3 is a schematic diagram illustrating interaction in a remittance process, according to an example implementation. As shown in FIG. 3, a process of interaction between users 1 and 2, wallets 1 and 2, and bank 1 can include the following steps.

Step 301: Wallet 1 receives a remittance request initiated by user 1.

In an implementation, user 1 can indicate a fund amount that needs to be remitted and a payee in the remittance request. For example, assume that user 1 sets the fund amount to 1000 yuan, and the payee is user 2. In addition to initiating the remittance request by user 1, a remittance procedure can be triggered in other methods in other scenarios. For example, user 1 initiates a payment request, of which the fund amount is 1000 yuan and the payee is user 2. For another example, user 2 initiates a collection request, of which the fund amount is 1000 yuan and the payer is user 1. Implementations are not limited in the present specification.

Step 302: Wallet 1 confirms that balances in customer fund account 1 corresponding to user 1 are sufficient, and confirms, to wallet 2, the existence of user 2 serving as a payee.

In an implementation, for example, customer fund account 1 corresponding to user 1 has a 5000 yuan balance, which is greater than 1000 yuan that needs to be transferred, and therefore, it is determined that the balance is sufficient. When the balance is less than 1000 yuan, it indicates that the balance is insufficient, and wallet 1 can directly terminate the remittance and return a notification message indicating that the remittance fails to user 1.

In an implementation, wallet 1 can send payee information to wallet 2, and wallet 2 determines whether the payee information is valid. The payee information can include a payee name, a payee account number, and an account opening bank. Implementations are not limited in the present specification. After verifying the payee information, wallet 2 can return a corresponding verification result to wallet 1. When it is determined that the payee does not exist, wallet 1 can directly terminate the remittance and return a notification message indicating that the remittance fails to user 1.

Step 303: Wallet 1 can perform a compliance check on a remittance event initiated by user 1 to user 2.

In an implementation, wallet 1 can provide a material submission entry for user 1, and user 1 provides to-be-checked materials for the remittance event. User 1 can submit static materials (for example, an identity card photo of user 1) that can be used for all remittance events in advance, and submit dynamic materials (for example, a recent remittance record) for a corresponding remittance event at each time of remittance, so as to improve remittance efficiency.

In an implementation, the compliance check performed by wallet 1 for the remittance event can include at least one of know your customer (KYC) check and anti-money laundering (AML) check. Implementations are not limited in the present specification.

Figure 4:
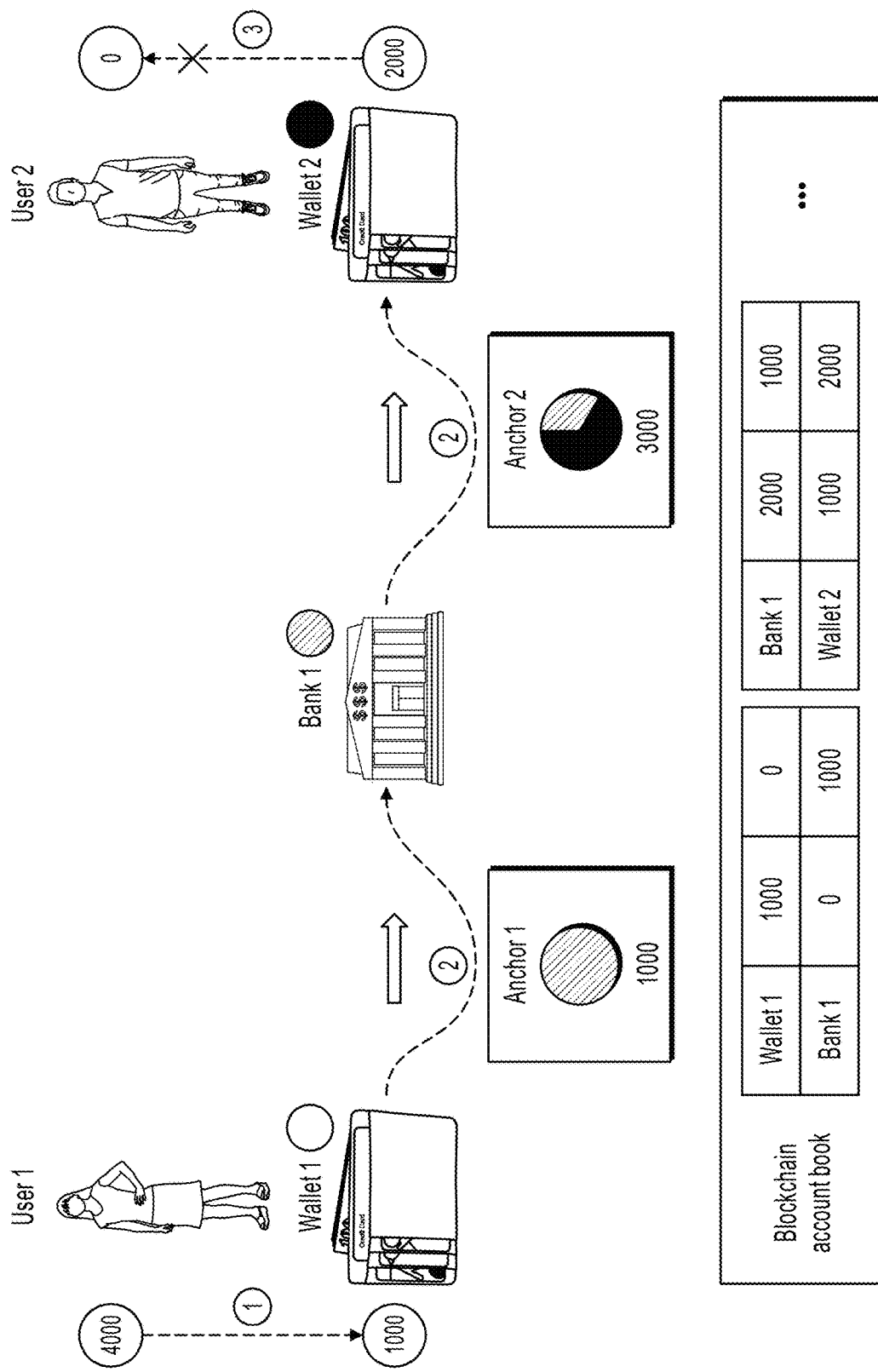
FIG. 4 is a schematic diagram illustrating determining a remittance route, according to an example implementation.

In an implementation, if a check result of the compliance check obtained by wallet 1 is unqualified, wallet 1 can directly terminate the remittance and return a notification message to user 1, indicating that the remittance fails. Alternatively, wallet 1 can provide user 1 with at least one opportunity to supplement materials. For example, assume that wallet 1 can provide user 1 with two opportunities at most; if the number of times of supplementing the materials by user 1 is greater than two and the check result is still unqualified, wallet 1 can terminate the remittance and return a notification message to user 1, indicating that the remittance fails. However, if the check result of the compliance check obtained by wallet 1 is qualified, as shown in FIG. 4, in phase C), wallet 1 can deduct 1000 yuan from customer fund account 1 corresponding to user 1, and transfer the 1000 yuan to self-owned account 1 of wallet 1.

Step 304: Wallet 1 initiates a "route request" contract operation.

Step 305: Wallet 1 determines a remittance route.

In an implementation, after joining the remittance contract, the members on the blockchain can invoke several contract operations supported by the remittance contract, such as the "route request" contract operation described here. The contract operation is used to determine the remittance route used by user 1 to remit money to user 2, to complete the remittance operation.

In an implementation, the remittance route includes wallet 1 serving as the most upstream member, wallet 2 serving as the most downstream member, and several intermediate members between wallet 1 and wallet 2. In the technical solution based on the present specification, the effect of "transferring a remittance fund (such as 1000 yuan that user 1 expects to remit) from wallet 1 to wallet 2" needs to be presented by using blockchain assets issued by the anchor point on the blockchain and held by all the members in the remittance route and through transfer between the blockchain assets, so that wallet 2 finally provides the remittance fund for user 2.

When the remittance fund is transferred between all the members in the remittance route, the remittance fund is separately transferred between adjacent members several times. For example, when the remittance route is "wallet 1-intermediate member-wallet 2", two pairs of adjacent members are included: "wallet 1-intermediate member" and "intermediate member-wallet 2", and two times of fund transfer are involved: fund transfer from wallet 1 to the intermediate member, and fund transfer from the intermediate member to wallet 2. The fund transfer between each pair of adjacent members needs to be implemented by using the anchor point on the blockchain, and specifically relates to two conditions: condition (1) a blockchain asset issued by an anchor point and held by an upstream member of the adjacent members is not less than a remittance amount; and condition (2) a downstream member of the adjacent members sets a trustline for the anchor point, and a sum of the remittance amount and a blockchain asset issued by the anchor point and held by the downstream member is not greater than a limit set by the trustline. In other words, an association anchor point exists between the upstream member and the downstream member. Blockchain assets issued by the association anchor point and held by the upstream member are sufficient for fund transfer, and the downstream member is willing to receive a blockchain asset issued by the association anchor point.

Wallet 1 can read the blockchain account book by using full account information stored in wallet 1 to learn holdings of members such as banks 1 to 3 and wallet 2 in blockchain assets issued by anchor points such as anchor points 1 to 3, and determine whether each member satisfies the previous condition (1) and condition (2) with reference to a trustline set by each member, to determine the remittance route.

Wallet 1 and bank 1 are used as an example: A blockchain asset issued by anchor point 1 and held by wallet 1 is 1000 yuan, and is not less than the 1000 yuan remittance amount. In addition, bank 1 sets trustline-YH1-1=2000 yuan for anchor point 1, a blockchain asset issued by anchor point 1 and held by bank 1 is 0 yuan, and a sum of the blockchain asset and the 1000 yuan remittance amount is 1000 yuan<2000 yuan. Therefore, anchor point 1 is an association anchor point between wallet 1 and bank 1, and wallet 1 and bank 1 can transfer assets to each other based on anchor point 1. Wallet 1 and bank 2 are used as another example. A blockchain asset issued by anchor point 1 and held by wallet 1 is 1000 yuan and is not less than the 1000 yuan remittance amount. In addition, bank 2 sets trustline-YH2-1=1200 yuan for anchor point 1, a blockchain asset issued by anchor point 1 and held by bank 2 is 1000 yuan, and a sum of the blockchain asset and the 1000 yuan remittance amount is 2000 yuan>1200 yuan. Therefore, anchor point 1 is not an association anchor point between wallet 1 and bank 2, and wallet 1 and bank 2 cannot transfer assets to each other based on anchor point 1.

Similarly, whether each member on the blockchain satisfies the condition (1) and the condition (2) can be determined in the previous method, so as to determine several intermediate members that can successively connect wallet 1 and wallet 2 in series, to obtain the entire remittance route. For example, FIG. 4 is a schematic diagram illustrating determining a remittance route, according to an example implementation. As shown in FIG. 4, the remittance route can include wallet 1-bank 1-wallet 2. An association anchor point between wallet 1 and bank 1 is anchor point 1, and an association anchor point between bank 1 and wallet 2 is anchor point 2.

In an implementation, wallet 1 can simultaneously determine a plurality of remittance routes, and select a finally used remittance route based on a certain condition. For example, the condition can include the shortest path and the lowest costs. Implementations are not limited in the present specification.

In an implementation, the remittance route shown in FIG. 4 includes wallet 1, bank 1, and wallet 2. Bank 1 serves as an intermediate member between wallet 1 and wallet 2, to implement remittance between wallet 1 and wallet 2. In another implementation, if wallet 1 and wallet 2 hold blockchain assets issued by the same anchor point, and satisfy the previous condition (1) and condition (2), no intermediate member is needed, and remittance can be directly implemented between wallet 1 and wallet 2. In still another implementation, a plurality of intermediate members possibly exist between wallet 1 and wallet 2, so that a blockchain balance of wallet 1 can be transferred to a blockchain balance of wallet 2 through the intermediate members, to implement remittance between wallet 1 and wallet 2.

Step 306: Wallet 1 initiates a compliance check request to all intermediate members in the remittance route.

In an implementation, when wallet 1 and wallet 2 belong to the same third-party payment platform, because wallet 1 has completed the compliance check in step 303, the check result of the compliance check is also applicable to wallet 2, that is, wallet 2 does not need to repeatedly perform the compliance check. In another implementation, wallet 1 and wallet 2 possibly belong to different third-party payment platforms. Therefore, in step 306, wallet 1 can simultaneously initiate the compliance check request to all the intermediate members and to wallet 2, so that all the intermediate members and wallet 2 perform the compliance check.

In an implementation, wallet 1 can push the to-be-checked materials provided by user 1 to bank 1, so that bank 1 performs the compliance check based on the to-be-checked materials, such as the KYC check and the AML check. described above. To ensure that the to-be-checked materials are complete and reliable in the push process, wallet 1 can generate a digital digest corresponding to the to-be-checked materials before push the to-be-checked materials, and record the digital digest on the blockchain by invoking a "proof of material existence" contract operation. After receiving the pushed to-be-checked materials, bank 1 can read the digital digest from the blockchain, and compare the digital digest with the digital digest of the to-be-checked materials. If the digital digests are the same, it is determined that the to-be-checked materials are complete and reliable; otherwise, it indicates that the to-be-inspected materials are faulty, and wallet 1 needs to provide the to-be-checked materials again.

In an implementation, after completing the compliance check request, a member in the remittance route can return a corresponding check result to wallet 1. The check result can include a digital digest corresponding to detailed data of the compliance check performed by the member, a determining result (qualified or unqualified), and signature information of the member (indicating that the check result is from the member). Because detailed data corresponding to the digital digest included in the check result relates to privacy information of user 1 and user 2, and the non-public rule applies when a member performs the compliance check, only the digital digest is included in the check result, and the detailed data is recorded in only the member, subsequently providing to regulatory authorities for verification or inspection.

Step 307: Wallet 1 initiates a "proof of compliance existence" contract operation to record an obtained check result in the blockchain account book.

In an implementation, by initiating the "proof of compliance existence" contract operation, wallet 1 can record the check result returned by bank 1 in a block corresponding to wallet 1 and further broadcast the check result to other nodes on the blockchain for recording; In other words, wallet 1 records the check result in the previous blockchain account book. Because the blockchain cannot be tampered with and can be traced, the check result can be reliably enough for subsequent retrieval and viewing by regulatory authorities.

Similarly, for the check result obtained in step 303, wallet 1 can also initiate the "proof of compliance existence" contract operation to record the check result in the blockchain account book for subsequent retrieval and viewing.

In an implementation, when the check result returned by any member is unqualified, wallet 1 can provide user 1 with at least one opportunity for supplementing materials. After obtaining supplementary materials, wallet 1 can provide the supplementary materials to the member, so that the member performs the compliance check again. Wallet 1 can record a digital digest of the supplementary materials in the blockchain account book, so that the member compares the digital digest of the received supplementary materials with the digital digest recorded in the blockchain account book, to determine whether the received supplementary materials are reliable. Assume that wallet 1 can provide user 1 with two opportunities at most. If the number of times of supplementing the materials by user 1 is greater than two and the check result returned by the member is still unqualified, wallet 1 can terminate the remittance and return a notification message indicating that the remittance fails to user 1.

In an implementation, after wallet 1 initiates the compliance check request to bank 1, if wallet 1 does not receive a returned check result within preset duration (for example, two minutes), wallet 1 can determine that the check result is unqualified. Wallet 1 then records the "unqualified" check result in the blockchain account book by invoking the "proof of compliance existence" contract operation, and further terminates the remittance and returns a notification message indicating that the remittance fails to user 1.

Step 308: When a result of each compliance check performed by bank 1 is qualified, wallet 1 initiates a "remittance" contract operation to implement fund transfer between all the members in the remittance route.

In an implementation, before the "remittance" contract operation takes effect, the blockchain account book records blockchain balances shown in FIG. 2, including the following: a blockchain asset issued by anchor point 1 and held by wallet 1 is 1000 yuan, a blockchain asset issued by anchor point 1 and held by bank 1 is 0 yuan, a blockchain asset issued by anchor point 2 and held by bank 1 is 2000 yuan, a blockchain asset issued by anchor point 2 and held by wallet 2 is 1000 yuan, and so on. After the "remittance" contract operation takes effect, fund transfers between wallet 1, bank 1, and wallet 2 in the remittance route occur sequentially. As shown in FIG. 4, in phase ②:

The fund transfer between wallet 1 and bank 1 is implemented by using anchor point 1. The blockchain asset issued by anchor point 1 and held by wallet 1 is transferred to bank 1 by 1000 yuan, so that the blockchain asset issued by anchor point 1 and held by wallet 1 decreases from 1000 yuan to 0 yuan, and the blockchain asset issued by anchor point 1 and held by bank 1 increases from 0 yuan to 1000 yuan. As described above, because bank 1 sets trustline-YH1-1=2000 yuan>0 yuan+1000 yuan for anchor point 1, the previous fund transfer can be implemented at anchor point 1.

The fund transfer between bank 1 and wallet 2 is implemented by using anchor point 2. The blockchain asset issued by anchor point 2 and held bank 1 is transferred to wallet 2 by 1000 yuan, so that the blockchain asset issued by anchor point 2 and held by bank 1 decreases from 2000 yuan to 1000 yuan, and the blockchain asset issued by anchor point 2 and held by wallet 2 increases from 1000 yuan to 2000 yuan. As described above, because wallet 2 sets trustline-QB2-2=3000 yuan>1000 yuan+1000 yuan for anchor point 2, the previous fund transfer can be implemented at anchor point 2.

During the fund transfer between wallet 1 and bank 1 and the fund transfer between bank 1 and wallet 2, because self-owned account 1 of wallet 1 increases by 1000 yuan from customer fund account 1 of user 1, and the blockchain asset issued by anchor point 1 and held by wallet 1 decreases by 1000 yuan, it means that a fund transfer net of wallet 1 is 0 yuan. Because the blockchain asset issued by anchor point 1 and held by bank 1 increases by 1000 yuan, and the blockchain asset issued by anchor point 2 and held by bank 1 decreases by 1000 yuan, it means that a fund transfer net of bank 1 is 0 yuan. Because the blockchain asset issued by anchor point 2 and held by wallet 2 increases by 1000 yuan, which is equivalent to that the 1000 yuan remitted by user 1 is transferred to the blockchain balance of wallet 2 through the remittance route.

It is worthwhile to note that all nodes on the blockchain use a unified blockchain account book, that is, the blockchain account book records holdings of all the members in blockchain assets issued by the anchor points. Therefore, the blockchain can simultaneously adjust the blockchain asset issued by anchor point 1 and held by wallet 1, blockchain assets issued by anchor point 1 and anchor point 2 and held by bank 1, and the blockchain asset issued by anchor point 2 and held by wallet 2, so that the blockchain balance of wallet 1 decreases by the 1000 yuan blockchain asset issued by anchor point 1, and the blockchain balance of wallet 2 increases by the 1000 yuan blockchain asset issued by anchor point 2, which means that the blockchain balances of the intermediate members remain unchanged.

In this case, in phase ③ shown in FIG. 4, wallet 2 can transfer 1000 yuan from self-owned account 2 to customer fund account 2 opened by user 2 at wallet 2. With reference to an increase of the 1000 yuan in the blockchain asset issued by anchor point 2 and held by wallet 2, which is equivalent to that a final fund transfer net of wallet 2 is 0 yuan, and user 2 obtains the 1000 yuan remitted from the user 1.

Step 309: Wallet 2 fails to transfer money to user 2, and the related fund cannot be credited to an account.

In an implementation, after steps 302 and 303, and step 306 are performed, problems that possibly occur in the remittance process have been checked and eliminated. Therefore, wallet 2 can successfully transfer money to user 2 in most cases. However, in some cases, for example, after step 306, a problem such as an insufficient collection amount balance or account freeze occurs in customer fund account 2 at wallet 2, causing a transfer failure in step 309. Consequently, the 1000 yuan that should have been transferred from self-owned account 2 cannot be credited to the account.

Step 310: Wallet 2 credits the unsuccessfully transferred-out fund to a self-owned account, namely, self-owned account 2.

Step 311: Wallet 2 writes a transaction reversal application into the blockchain.

In an implementation, wallet 2 obtains a serial number corresponding to the transaction, during which user 1 remits 1000 yuan to user 2 in this implementation, adds the serial number to the transaction reversal application, and then writes the transaction reversal application into the blockchain, to record the transaction reversal application in the blockchain account book.

Step 312: Wallet 1 detects a corresponding reversal notification from the blockchain in response to the transaction reversal application written into the blockchain.

Step 313: Wallet 1 advances and returns the fund to user 1.

Step 314: Wallet 1 performs fund clearing with wallet 2.

Figure 5:
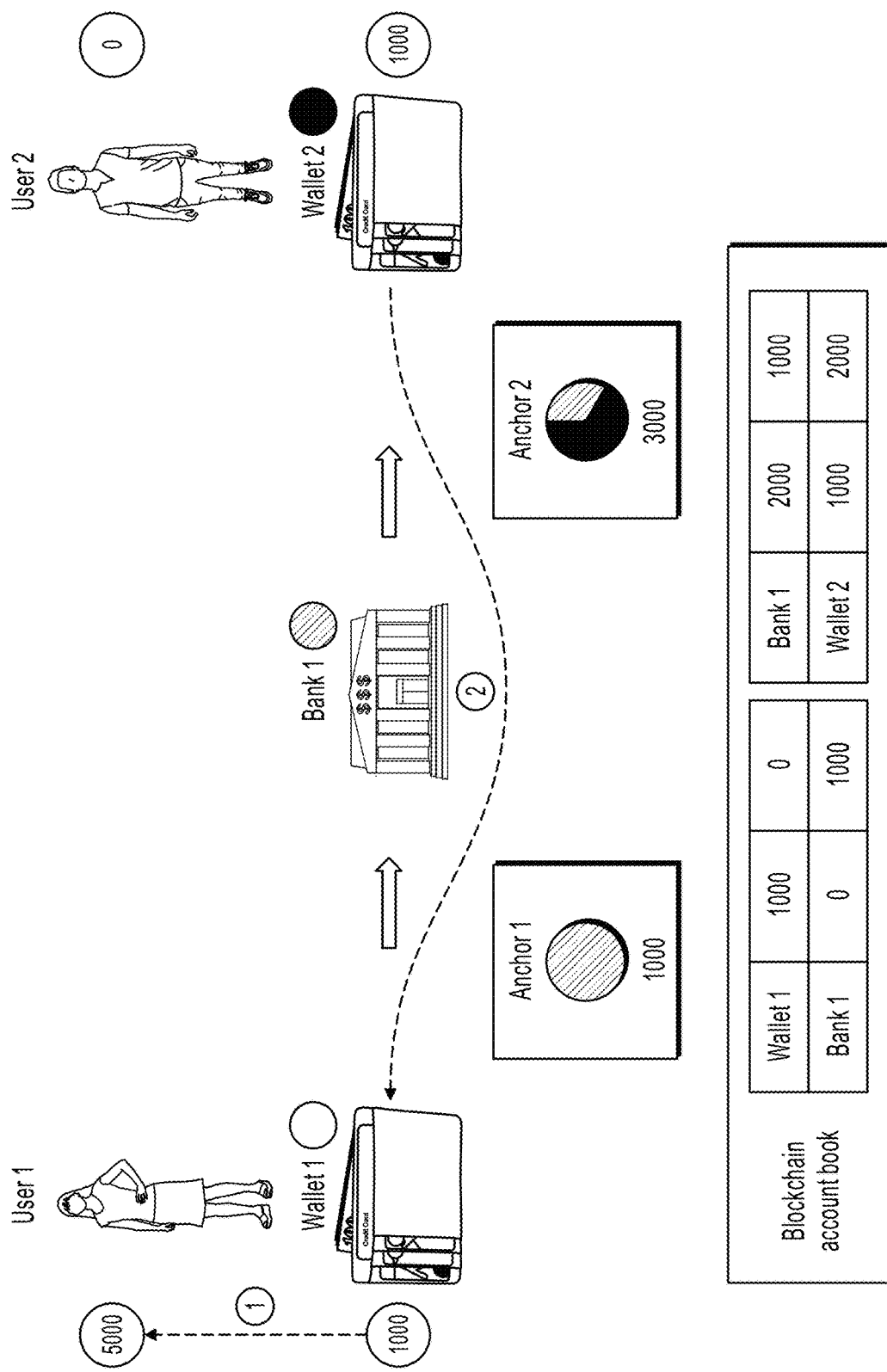
FIG. 5 is a schematic diagram illustrating a fund return, according to an example implementation.

In an implementation, FIG. 5 is a schematic diagram illustrating a fund return, according to an example implementation. As shown in FIG. 5, the fund return can be completed through the following two phases:

Phase ①: After receiving the reversal notification, wallet 1 can read the transaction reversal application written by wallet 2 from the blockchain, and obtain the serial number of the transaction from the transaction reversal application to determine the transaction reversal application is the remittance operation that is expected to be performed for the implementation shown in FIG. 3. Because the transaction reversal application has been written into the blockchain, the content of the transaction reversal application is recorded in the blockchain account book and cannot be tampered with. Therefore, wallet 1 can actively advance the fund and return 1000 yuan to user 1 (for example, transfer 1000 yuan from self-owned account 1 to customer fund account 1), without worrying that wallet 2 does not return the unsuccessfully transferred 1000 yuan.

Phase ②: Wallet 2 and wallet 1 can use an offline clearing method, that is, wallet 2 transfers 1000 yuan to wallet 1, which is equivalent to that wallet 2 returns the unsuccessfully transferred 1000 yuan to wallet 1. Wallet 1 and wallet 2 can clear funds once a month or based on another agreed frequency, to process retained funds generated in a corresponding period. In addition, because the transaction reversal application is recorded on the blockchain, wallet 1 and wallet 2 can match between the transaction reversal application and the offline clearing record to avoid bad debts, doubtful debts, and the like.

Figure 6:
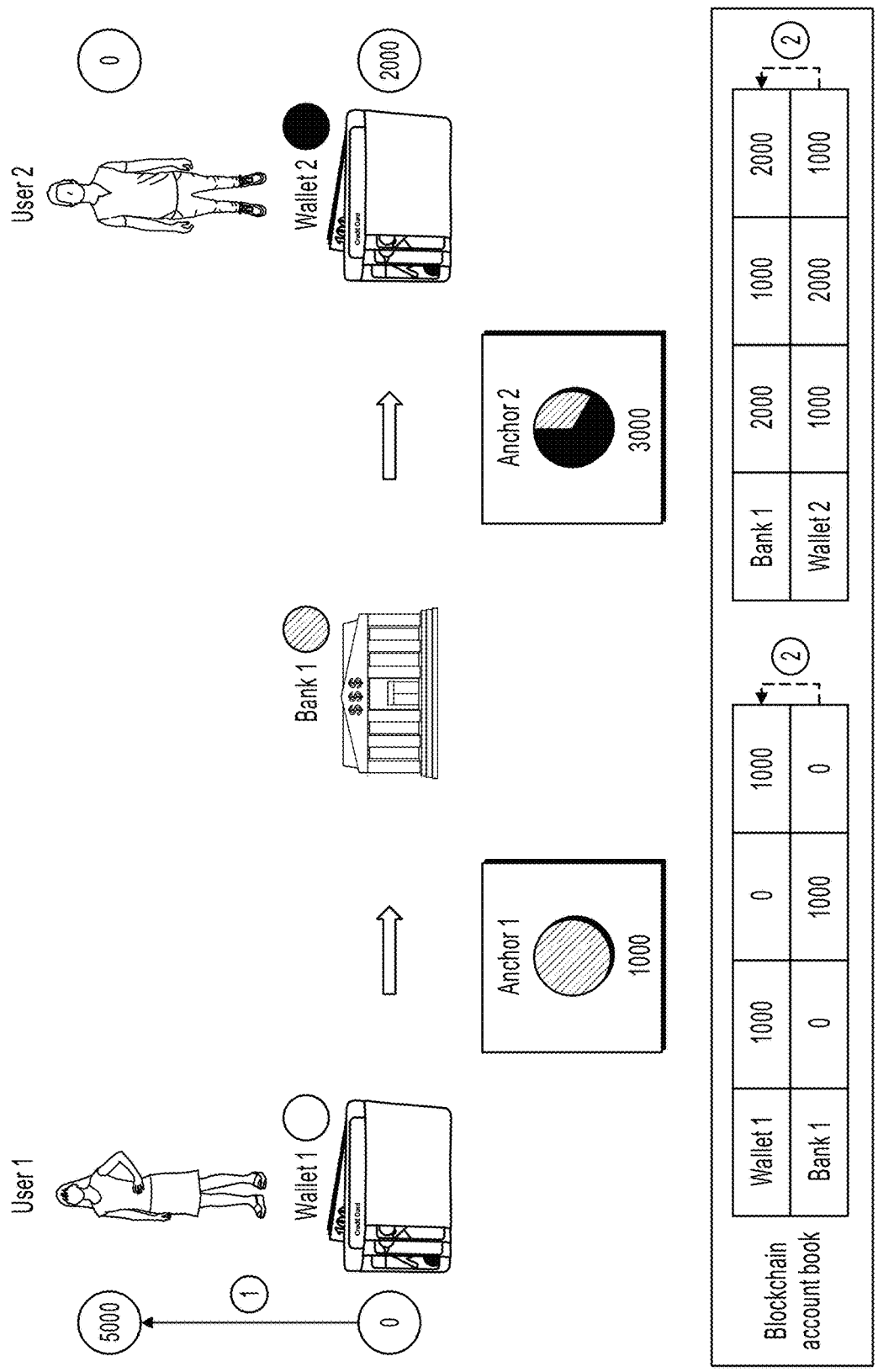
FIG. 6 is a schematic diagram illustrating another fund return, according to an example implementation.

It is worthwhile to note that in the implementation shown in FIG. 5, in the offline account clearing method, wallet 2 can reserve the 1000 yuan blockchain fund received at anchor point 2 without returning the fund by using the blockchain. In another implementation, fund return processing can be implemented based on the blockchain. For example, FIG. 6 is a schematic diagram illustrating another fund return, according to an example implementation. As shown in FIG. 6, the fund return can be completed through the following two phases:

Phase ①: This phase is the same as the implementation shown in FIG. 5, and details are omitted here for simplicity.

Phase ②: The blockchain asset issued by anchor point 2 and held by wallet 2 is transferred to bank 1 by 1000 yuan, so that the blockchain asset issued by anchor point 2 and held by wallet 2 decreases from 2000 yuan to 1000 yuan, and the blockchain asset issued by anchor point 2 and held by bank 1 increases from 1000 yuan to 2000 yuan. In addition, the blockchain asset issued by anchor point 1 and held by bank 1 is transferred to wallet 1 by 1000 yuan, so that the blockchain asset issued by anchor point 1 and held by bank 1 decreases from 1000 yuan to 0 yuan, and the blockchain asset issued by anchor point 1 and held by wallet 1 increases from 0 yuan to 1000 yuan.

It is worthwhile to note that in the implementation shown in FIG. 6, although theoretically, the blockchain asset in wallet 2 can be returned to wallet 1 through blockchain asset transfer, blockchain asset transfer further relates to rules such as a trustline set at each anchor point by each blockchain member, causing some obstacles. For example, the blockchain asset issued by anchor point 2 and held by bank 1 can increase due to a transfer-in operation performed by another blockchain member, so that the blockchain asset issued by anchor point 2 and held by wallet 2 cannot be transferred to bank 1 by 1000 yuan due to the trustline. In this case, a "route request" contract operation can be initiated to re-determine a remittance route for remittance from wallet 2 to wallet 1, and wallet 2 remits 1000 yuan to wallet 1 based on the remittance route.

Figure 7:
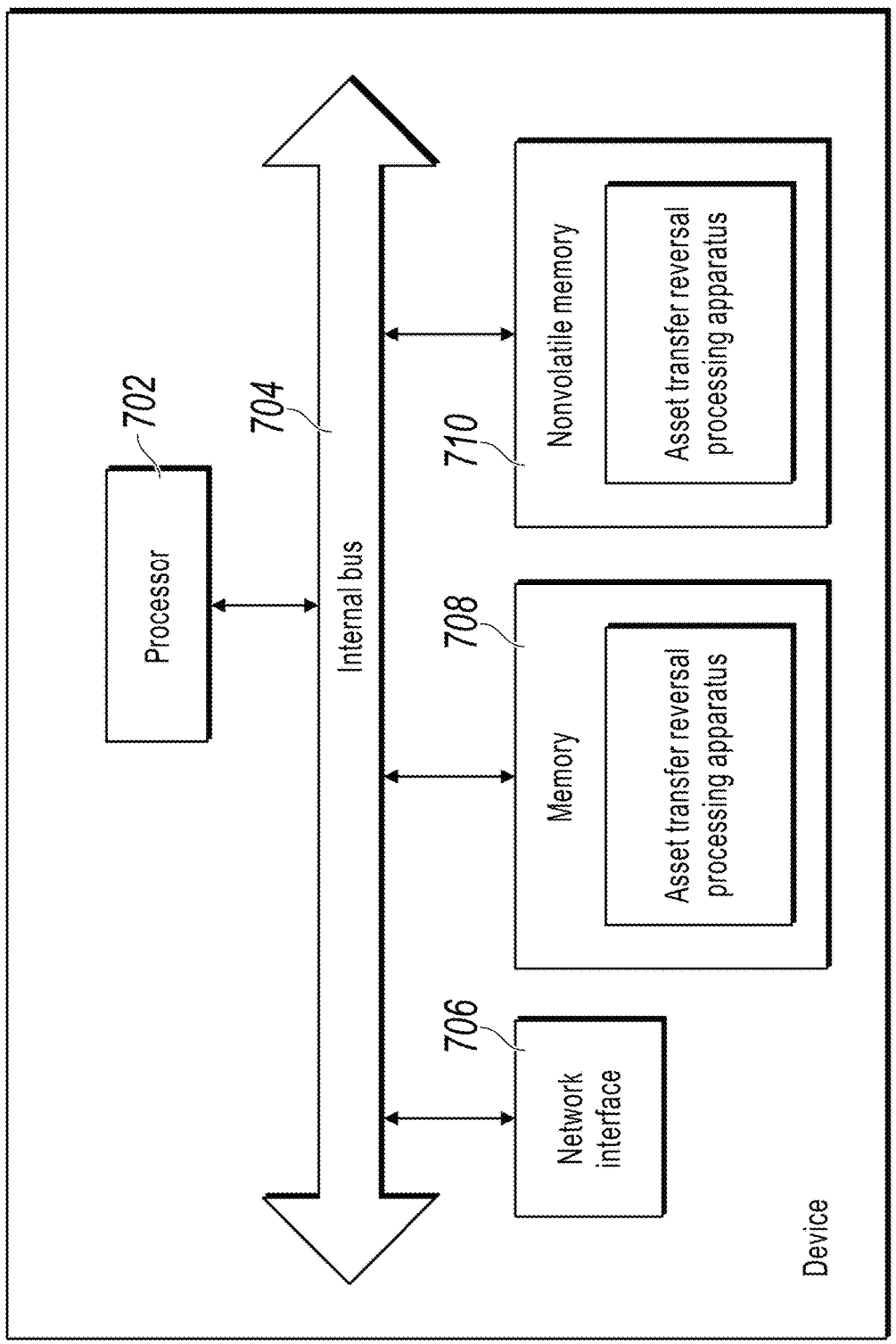
FIG. 7 is a schematic structural diagram illustrating a device, according to an example implementation.

FIG. 7 is a schematic structural diagram illustrating a device, according to an example implementation. Referring to FIG. 7, in terms of hardware, the device includes a processor 702, an internal bus 704, a network interface 706, a memory 708, and a nonvolatile memory 710, and certainly can further include the hardware needed by other services. The processor 702 reads a corresponding computer program from the nonvolatile memory 710 into the memory 708 and then runs the corresponding computer program, so as to logically form an asset transfer reversal processing apparatus. Certainly, in addition to software implementation, one or more implementations of the present specification do not exclude another implementation, for example, a logic device or a combination of hardware and software. That is, an executive body of the following processing procedure is not limited to each logic unit, and can also be hardware or a logic device.

Figure 8:
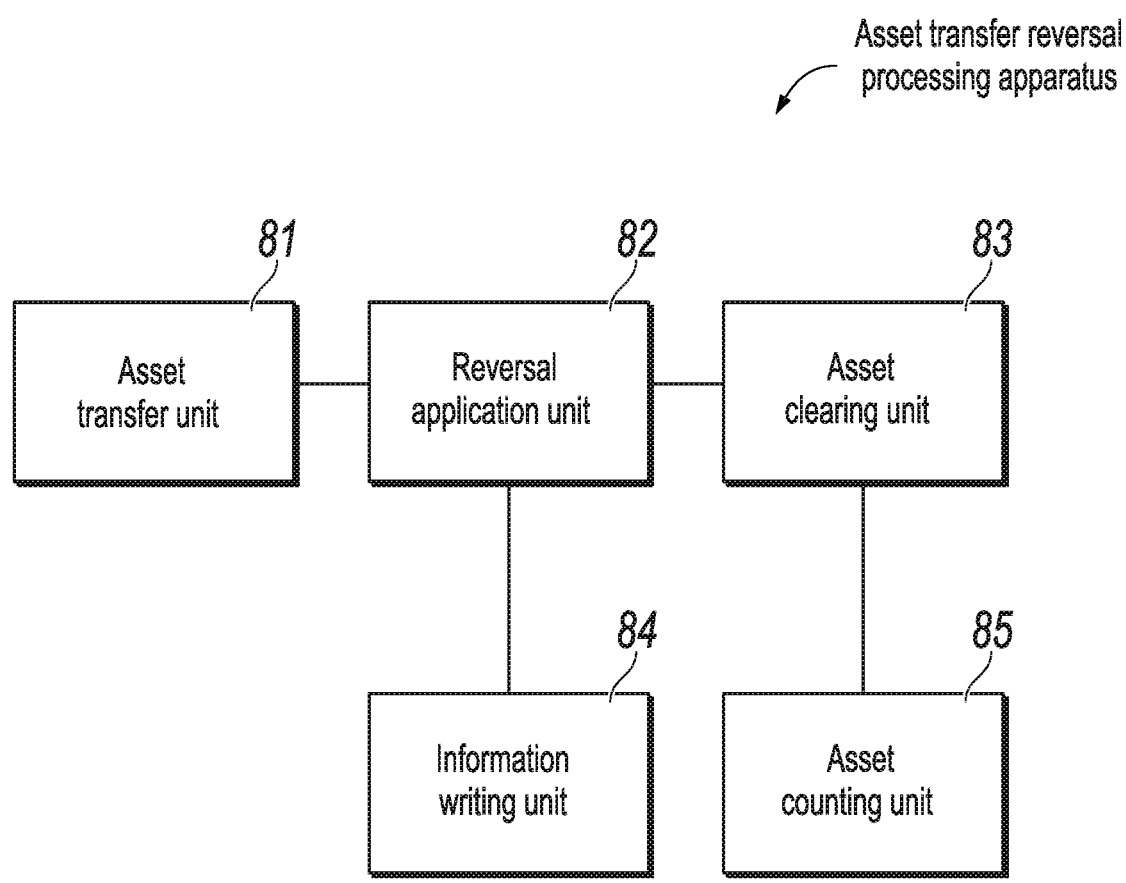
FIG. 8 is a block diagram illustrating an asset transfer reversal processing apparatus, according to an example implementation.

Referring to FIG. 8, in a software implementation, the asset transfer reversal processing apparatus can include: an asset transfer unit 81, configured to enable a first blockchain member corresponding to a payee to obtain a blockchain asset transferred in by a second blockchain member corresponding to a payer in response to an asset transfer request between the payer and the payee, and perform a corresponding off-chain asset transfer-out operation for the payee; a reversal application unit 82, configured to enable the first blockchain member to write a transaction reversal application for an asset transfer transaction corresponding to the asset transfer request into a blockchain when the transfer-out operation fails; and an asset clearing unit 83, configured to enable the first blockchain member to perform asset clearing with the second blockchain member for an off-chain asset corresponding to the transfer-out operation.

Optionally, the apparatus further includes: an information writing unit 84, configured to enable the first blockchain member to write a serial number of the asset transfer transaction into the transaction reversal application.

Optionally, the apparatus further includes: an asset counting unit 85, configured to enable the first blockchain member to count the off-chain asset corresponding to the transfer-out operation into a preset off-chain account.

The asset clearing unit 83 is specifically configured to enable the first blockchain member to regularly summarize surplus assets in the preset off-chain account, to return the surplus assets to the second blockchain member to complete asset clearing.

Optionally, the asset clearing unit 83 is specifically configured to: enable the first blockchain member to transfer a blockchain asset to the second blockchain member, where the transferred blockchain asset is equal to the blockchain asset transferred by the second blockchain member to the first blockchain member based on the asset transfer request.

Optionally, a time interval between a write-in moment of the transaction reversal application and a creation moment of the asset transfer transaction is not greater than a preset interval.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of several devices in these devices.

In a typical configuration, the computer includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette tape, a magnetic disk storage, a quantum memory, a graphene-based storage medium or another magnetic storage device, or any other non-transmission medium. The computer storage medium can be used to store information that can be accessed by the computing device. Based on the definition in the present specification, the computer readable medium does not include transitory computer readable media (transitory media) such as a modulated data signal and carrier.

It is worthwhile to further note that the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some cases, the actions or steps described in the claims can be performed in an order different from that in the implementation and the desired results can still be achieved. In addition, the process described in the accompanying drawings does not necessarily require a particular execution order to achieve the desired results. In some implementations, multi-task processing and parallel processing can be performed or can be advantageous.

The terms used in the one or more implementations of the present specification are merely for the purpose of describing specific implementations, and are not intended to limit the one or more implementations of the present specification. The terms "a" and "the" in a singular form used in the one or more implementations of the present specification and the appended claims are also intended to include a plural form, unless otherwise specified in the context clearly. It should be further understood that the term "and/or" used in the present specification indicates and includes any or all possible combinations of the one or more associated listed items.

It should be understood that although terms "first", "second", and "third" can be used in one or more implementations of the present specification to describe various types of information, the information is not limited to the terms. These terms are only used to differentiate information of a same type. For example, without departing from the scope of the one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, and improvement made without departing from the spirit and principle of the one or more implementations of the present specification shall fall within the protection scope of the one or more implementations of the present specification.

Figure 9:
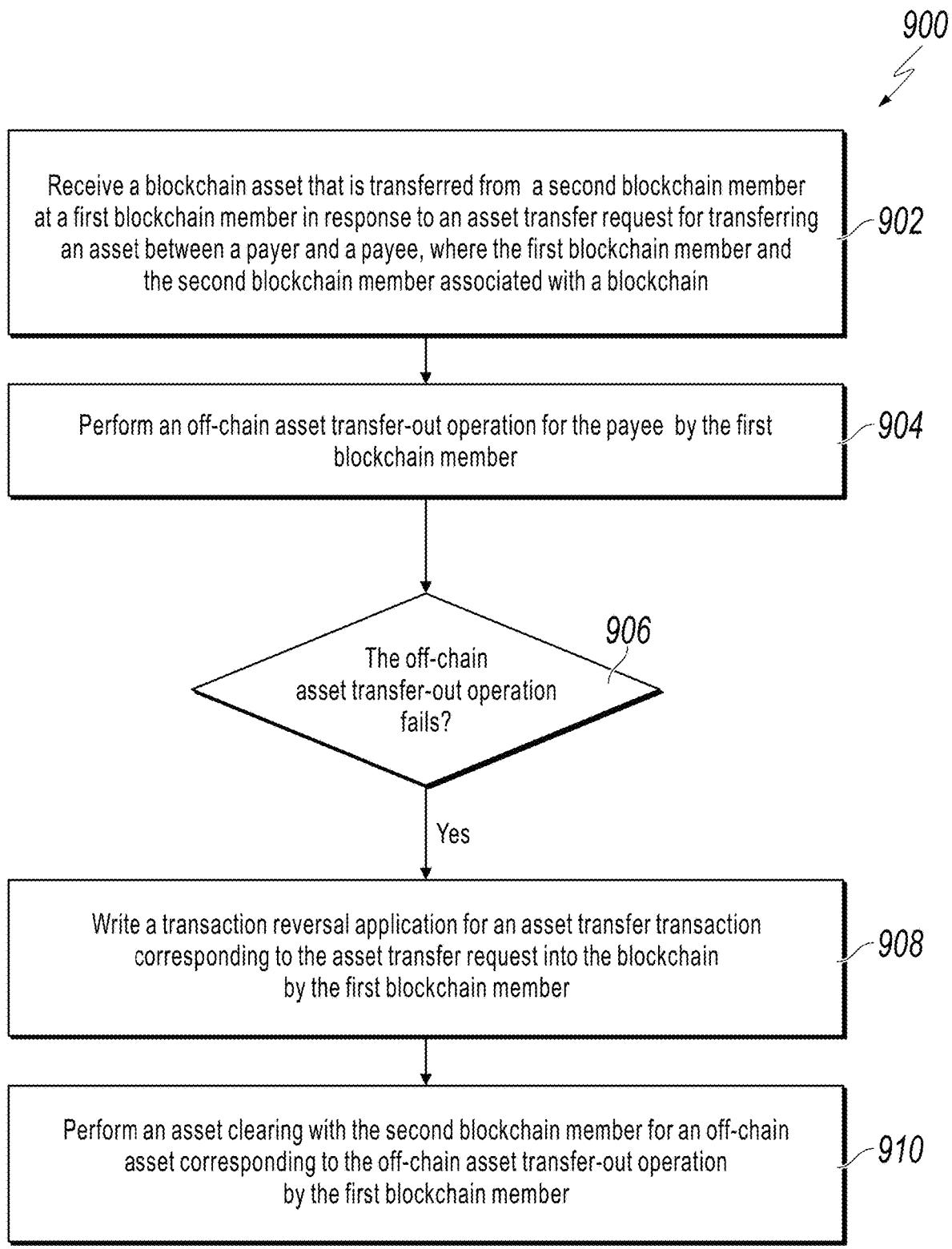
FIG. 9 is a flowchart illustrating an example of a computer-implemented method for processing asset transfers, according to an implementation of the present disclosure.

FIG. 9 is a flowchart illustrating an example of a computer-implemented method 900 for processing asset transfers, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a blockchain asset that is transferred from a second blockchain member is received at a first blockchain member in response to an asset transfer request for transferring an asset between a payer and a payee, where the first blockchain member and the second blockchain member are associated with a blockchain. In some implementations, the first blockchain member corresponds to the payee and the second blockchain member corresponds to the payer. From 902, method 900 proceeds to 904.

At 904, in response to receiving the blockchain asset, an off-chain asset transfer-out operation for the payee is performed by the first blockchain member. From 904, method 900 proceeds to 906.

At 906, a determination is made as to whether the off-chain asset transfer-out operation fails. If it is determined that the off-chain asset transfer-out operation fails, method 900 proceeds to 908.

At 908, a transaction reversal application for an asset transfer transaction corresponding to the asset transfer request is written into the blockchain by the first blockchain member. In some implementations, a serial number associated with the asset transfer transaction is written into the transaction reversal application by the first blockchain member.

In some implementations, a time interval between a write-in moment associated with the transaction reversal application and a creation moment associated with the asset transfer transaction is not greater than a preset interval. From 908, method 900 proceeds to 910.

At 910, in response to writing the transaction reversal application, an asset clearing with the second blockchain member for an off-chain asset corresponding to the off-chain asset transfer-out operation is performed by the first blockchain member.

In some implementations, performing the asset clearing includes counting the off-chain asset corresponding to the off-chain asset transfer-out operation into a preset off-chain account; summarizing, as summarized surplus assets, surplus assets in the preset off-chain account; and returning the summarized surplus assets to the second blockchain member. In some implementations, summarizing the surplus assets can be done regularly. For example, by each day, each week, or any other chronological frequency as needed.

In some implementations, performing the asset clearing includes transferring a blockchain asset to the second blockchain member, where the blockchain asset that is transferred is equal to the blockchain asset that is transferred in by the second blockchain member to the first blockchain member based on the asset transfer request. After 910, method 900 can stop.

Implementations of the present application can solve technical problems in data assets transfer between different members of a blockchain network. When a first user transfers data asset to a second user (in some cases through several intermediate users), the transfer may fail because the second user does not have a sufficient credit limit or because the second user's account is frozen. Traditionally, when such an event occurs, the transaction is canceled and the data assets are transferred back to the account of the first user through the original transfer route. However, the traditional method takes a relatively long time for the first user to receive transferred data assets. In addition, because in some cases, the data assets transfer through several other intermediate users, extra costs can be incurred (including financial, computational, or data transfer) and data security may be affected (for example, more opportunities to seek to intercept or influence a data assets transfer) during the transfer. What is needed is a technique to bypass these problems in the traditional methods, and to providing a faster and more secure solution for data transfer when a transaction failure occurs.

Implementations of the present application provide methods and apparatuses for improving data assets transfer between different user accounts based on blockchain technology. According to some implementations, anchor points are used to anchor blockchain assets on a blockchain to off-chain assets outside the blockchain, so that an off-chain asset can be exchanged for an equivalent blockchain asset through the anchor point, implementing a one-to-one mapping between the blockchain assets and off-chain assets. When a sender transfers data assets to a receiver, the sender first sends an off-chain asset to the second blockchain member, and the second blockchain member transfers the held blockchain data asset to the first blockchain member in response to the data asset transfer request. Then the first blockchain member sends the off-chain data asset to the receiver, which is equivalent to the sender transferring the off-chain asset to the receiver. In the case where a transaction failure occurs, the first blockchain member writes a transaction reversal application and publishes it on the blockchain. The second blockchain member can return the related off-chain data asset to the sender in advance based on the transaction reversal application.

In some implementations, the described methods and apparatuses can reduce data processing complexity and cost for blockchain members by transferring blockchain data assets and off-chain assets through anchor points. Because information on the blockchain cannot be tampered with and can be traced, the transaction reversal application registered in the blockchain account book is reliable enough and can be trusted by all the blockchain members and anchor points. Therefore, the second blockchain member can return the data assets without worrying that the first blockchain member refuses to return a related asset to the second blockchain member. As such, the sender can obtain the returned off-chain asset as soon as possible while ensuring the reliability of data asset reversal processing. Thereby reducing the data processing time and additional cost and security risks may incur during the data assets transfer.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for reversing transactions, the computer-implemented method comprising:

in response to an asset transfer request for transferring an amount of a first off-chain asset from a payer to a payee, receiving, by a first blockchain member corresponding to the payee, a blockchain asset having a same value as the amount of the first off-chain asset and that is transferred, from a second blockchain member corresponding to the payer in response to receiving the asset transfer request and the first off-chain asset from a first off-chain account of the payer, to the first blockchain member through a first blockchain route of multiple blockchain members comprising a first series of intermediate blockchain members and a plurality of anchor points, wherein the first blockchain member, the second blockchain member, the series of intermediate blockchain members, and the plurality of anchor points include nodes on a blockchain network comprising a blockchain distributed between members of the blockchain, wherein each node of each anchor point exchanges, for members of the blockchain, blockchain assets for corresponding off-chain assets, and wherein each pair of adjacent intermediate blockchain members in the series hold respective blockchain assets issued by a same anchor point in the plurality of anchor points;

in response to receiving the blockchain asset, initiating, by a first blockchain node of the first blockchain member, an off-chain asset transfer-out operation to transfer a second off-chain asset corresponding to the blockchain asset to a second off-chain account of the payee;

determining, by the first blockchain node, that the off-chain asset transfer-out operation fails such that the second off-chain asset cannot be transferred to the second off-chain account of the payee;

in response to determining that the off-chain asset transfer-out operation fails, writing, by the first blockchain node and into the blockchain, a transaction reversal application for an asset transfer transaction corresponding to the asset transfer request, wherein the transaction reversal application comprises information identifying the asset transfer transaction for which the off-chain asset transfer-out operation failed and for which transaction reversal is being performed, thereby enabling other blockchain members to correlate the transaction reversal with the asset transfer request, the first blockchain member, and the second blockchain member; and in response to writing the transaction reversal application into the blockchain:

transferring, by a second blockchain node of the second blockchain member, a third off-chain asset corresponding to the first off-chain asset to the first off-chain account of the payer in advance of the first blockchain member returning the blockchain asset to the second blockchain member; and transferring, by the first blockchain member, the blockchain asset to the second blockchain member, the transferring comprising:

determining, by the first blockchain node and based on trustlines that indicate a maximum amount of blockchain assets that each blockchain member is willing to receive from each anchor point, that the second blockchain asset cannot be transferred to the second blockchain member using the first blockchain route;

selecting, by the first blockchain node and based on the trustlines and the blockchain asset, a second blockchain route from the first blockchain member to the second blockchain member through a second series of intermediate blockchain members for which the trustlines are satisfied; and initiating, by the first blockchain node, a transfer of the blockchain asset from the first blockchain member to the second blockchain member through the second series of intermediate blockchain members of the second blockchain route.

2. The computer-implemented method of claim 1, wherein the information identifying the asset transfer transaction comprises a serial number associated with the asset transfer transaction that is written into the transaction reversal application by the first blockchain member.

3. The computer-implemented method of claim 1, wherein the transaction reversal application is published on the blockchain.

4. The computer-implemented method of claim 1, wherein a time interval between a write-in moment associated with the transaction reversal application and a creation moment associated with the asset transfer transaction is not greater than a preset interval.

5. The computer-implemented method of claim 1, wherein performing the asset clearing includes:
transferring an additional blockchain asset to the second blockchain member, wherein the additional blockchain asset is equal to the blockchain asset that is transferred by the second blockchain member to the first blockchain member based on the asset transfer request.

6. A non-transitory, computer-readable medium for reversing transactions, the non-transitory, computer-readable medium storing one or more instructions executable by a computer system comprising a first blockchain node of a first blockchain member to perform operations comprising:
in response to an asset transfer request for transferring an amount of a first off-chain asset from a payer to a payee, receiving, by the first blockchain member corresponding to the payee, a blockchain asset having a same value as the amount of the first off-chain asset and that is transferred, from a second blockchain member corresponding to the payer in response to receiving the asset transfer request and the first off-chain asset from a first off-chain account of the payer, to the first blockchain member through a first blockchain route of multiple blockchain members comprising a first series of intermediate blockchain members and a plurality of anchor points, wherein the first blockchain member, the second blockchain member, the series of intermediate blockchain members, and the plurality of anchor points include nodes on a blockchain network comprising a blockchain distributed between members of the blockchain, wherein each node of each anchor point exchanges, for members of the blockchain, blockchain assets for corresponding off-chain assets, and wherein each pair of adjacent intermediate blockchain members in the series hold respective blockchain assets issued by a same anchor point in the plurality of anchor points;

in response to receiving the blockchain asset, initiating, by the first blockchain node of the first blockchain member, an off-chain asset transfer-out operation to transfer a second off-chain asset corresponding to the blockchain asset to a second off-chain account of the payee;

determining, by the first blockchain node, that the off-chain asset transfer-out operation fails such that the second off-chain asset cannot be transferred to the second off-chain account of the payee;

in response to determining that the off-chain asset transfer-out operation fails, writing, by the first blockchain node and into the blockchain, a transaction reversal application for an asset transfer transaction corresponding to the asset transfer request, wherein the transaction reversal application comprises information identifying the asset transfer transaction for which the off-chain asset transfer-out operation failed and for which transaction reversal is being performed, thereby enabling other blockchain members to correlate the transaction reversal with the asset transfer request, the first blockchain member, and the second blockchain member; and in response to writing the transaction reversal application into the blockchain:
transferring, by a second blockchain node of the second blockchain member, a third off-chain asset corresponding to the first off-chain asset to the first off-chain account of the payer in advance of the first blockchain member returning the blockchain asset to the second blockchain member; and transferring, by the first blockchain member, the blockchain asset to the second blockchain member, the transferring comprising:
determining, by the first blockchain node and based on trustlines that indicate a maximum amount of blockchain assets that each blockchain member is willing to receive from each anchor point, that the second blockchain asset cannot be transferred to the second blockchain member using the first blockchain route;

selecting, by the first blockchain node and based on the trustlines and the blockchain asset, a second blockchain route from the first blockchain member to the second blockchain member through a second series of intermediate blockchain members for which the trustlines are satisfied; and initiating, by the first blockchain node, a transfer of the blockchain asset from the first blockchain member to the second blockchain member through the second series of intermediate blockchain members of the second blockchain route.

7. The non-transitory, computer-readable medium of claim 6, wherein the information identifying the asset transfer transaction comprises a serial number associated with the asset transfer transaction that is written into the transaction reversal application by the first blockchain member.

8. The non-transitory, computer-readable medium of claim 6, wherein the transaction reversal application is published on the blockchain.

9. The non-transitory, computer-readable medium of claim 6, wherein a time interval between a write-in moment associated with the transaction reversal application and a creation moment associated with the asset transfer transaction is not greater than a preset interval.

10. The non-transitory, computer-readable medium of claim 6, wherein performing the asset clearing includes:
transferring an additional blockchain asset to the second blockchain member, wherein the additional blockchain asset is equal to the blockchain asset that is transferred by the second blockchain member to the first blockchain member based on the asset transfer request.

11. A computer-implemented system for reversing transactions, the system comprising:
one or more computers comprising a first blockchain node of a first blockchain member; and one or more computer memory devices interoperably coupled with the one or more computers and having tangible, non-transitory, machine-readable media storing one or more instructions that, when executed by the one or more computers, perform one or more operations comprising:

in response to an asset transfer request for transferring an amount of a first off-chain asset from a payer to a payee, receiving, by the first blockchain member corresponding to the payee, a blockchain asset having a same value as the amount of the first off-chain asset and that is transferred, from a second blockchain member corresponding to the payer in response to receiving the asset transfer request and the first off-chain asset from a first off-chain account of the payer, to the first blockchain member through a first blockchain route of multiple blockchain members comprising a first series of intermediate blockchain members and a plurality of anchor points, wherein the first blockchain member, the second blockchain member, the series of intermediate blockchain members, and the plurality of anchor points include nodes on a blockchain network comprising a blockchain distributed between members of the blockchain, wherein each node of each anchor point exchanges, for members of the blockchain, blockchain assets for corresponding off-chain assets, and wherein each pair of adjacent intermediate blockchain members in the series hold respective blockchain assets issued by a same anchor point in the plurality of anchor points;

in response to receiving the blockchain asset, initiating, by the first blockchain node of the first blockchain member, an off-chain asset transfer-out operation to transfer a second off-chain asset corresponding to the blockchain asset to a second off-chain account of the payee;

determining, by the first blockchain node, that the off-chain asset transfer-out operation fails such that the second off-chain asset cannot be transferred to the second off-chain account of the payee;

in response to determining that the off-chain asset transfer-out operation fails, writing, by the first blockchain node and into the blockchain, a transaction reversal application for an asset transfer transaction corresponding to the asset transfer request, wherein the transaction reversal application comprises information identifying the asset transfer transaction for which the off-chain asset transfer-out operation failed and for which transaction reversal is being performed, thereby enabling other blockchain members to correlate the transaction reversal with the asset transfer request, the first blockchain member, and the second blockchain member; and in response to writing the transaction reversal application into the blockchain:
  transferring, by a second blockchain node of the second blockchain member, a third off-chain asset corresponding to the first off-chain asset to the first off-chain account of the payer in advance of the first blockchain member returning the blockchain asset to the second blockchain member; and
  transferring, by the first blockchain member, the blockchain asset to the second blockchain member, the transferring comprising:
    determining, by the first blockchain node and based on trustlines that indicate a maximum amount of blockchain assets that each blockchain member is willing to receive from each anchor point, that the second blockchain asset cannot be transferred to the second blockchain member using the first blockchain route;
    selecting, by the first blockchain node and based on the trustlines and the blockchain asset, a second blockchain route from the first blockchain member to the second blockchain member through a second series of intermediate blockchain members for which the trustlines are satisfied; and
    initiating, by the first blockchain node, a transfer of the blockchain asset from the first blockchain member to the second blockchain member through the second series of intermediate blockchain members of the second blockchain route.

12. The computer-implemented system of claim 11, wherein the information identifying the asset transfer transaction comprises a serial number associated with the asset transfer transaction is written into the transaction reversal application by the first blockchain member.

13. The computer-implemented system of claim 11, wherein the transaction reversal application is published on the blockchain.

14. The computer-implemented method of claim 1, further comprising:
  selecting, for the asset transfer request, the first blockchain route, the selecting comprising:
    identifying each pair of adjacent intermediate blockchain members based on (i) a respective blockchain asset issued by the same anchor point for the pair of adjacent intermediate blockchain members and held by an upstream member of the pair of adjacent intermediate blockchain members is not less than an amount of the blockchain asset, (ii) a downstream member of the pair of adjacent intermediate blockchain members has set a trustline for the same anchor point for the pair of adjacent intermediate blockchain members, and (iii) a sum of the amount of the blockchain asset and an additional blockchain asset issued by the same anchor point for the pair of adjacent intermediate blockchain members and held by the downstream member is not greater than a limit set by the trustline; and
    identifying a sequence of pairs of adjacent intermediate blockchain members between the second blockchain member and the first blockchain member.

15. The computer-implemented method of claim 14, wherein selecting, for the asset transfer request, the first blockchain route comprising the series of intermediate blockchain members and the plurality of anchor points comprises:
  determining a plurality of remittance routes between the second blockchain member and the first blockchain member; and
  selecting, from the plurality of remittance routes, a shortest remittance route.

* * * * *